United States Patent [19]

An et al.

[11] Patent Number: 4,726,056
[45] Date of Patent: Feb. 16, 1988

[54] SHARED FLEXIBLE RATING OF TELECOMMUNICATIONS CALLS

[75] Inventors: Chungming An, Holmdel, N.J.; Martin Erk, Honesdale, Pa.; Michael A. Kefauver, Reynoldsburg, Ohio; Richard A. Williams, Chatham, N.J.

[73] Assignee: American Telephone and Telegraph Company AT&T Bell Laboratories, Murray Hill, N.J.

[21] Appl. No.: 878,421

[22] Filed: Jun. 25, 1986

[51] Int. Cl.[4] .......................................... H04M 15/00
[52] U.S. Cl. ..................................... 379/115; 379/114
[58] Field of Search ............... 379/111, 113, 114, 115, 379/116, 207, 121

[56] References Cited

U.S. PATENT DOCUMENTS

| | | | |
|---|---|---|---|
| 4,031,324 | 6/1977 | Dudonis | 379/148 |
| 4,090,034 | 5/1978 | Moylan | 179/7.1 R |
| 4,091,238 | 5/1978 | Samuels et al. | 179/7.1 R |
| 4,162,377 | 7/1979 | Mearns | 179/18 D |
| 4,191,860 | 3/1980 | Weber | 179/18.B |
| 4,525,601 | 6/1985 | Barnich et al. | 379/112 |

FOREIGN PATENT DOCUMENTS

WO85/02741 6/1985 PCT Int'l Appl. .

OTHER PUBLICATIONS

R. G. Basinger et al., "Calling Card Service—Overall Description and Operational Characteristics", *Bell System Technical Journal*, vol. 61, No. 7, Part 3, Sep. 1982, pp. 1655-1673.

D. E. Confalone et al., "Calling Card Service-TSPS Hardware, Software, and Signaling Implementation", *Bell System Technical Journal*, vol. 61, No. 7, Part 3, Sep. 1982, pp. 1675-1714.

J. Cariou et al., "The Freephone Service: A New Application for the E12 System", *Commutation and Transmission*, No. 5, Dec. 1982, pp. 63-73.

*Financial Times Survey[III]*, World Telecommunications p. VI, "Regional Regroupings Presage Higher Local Charges", Paul Taylor.

M. Berger et al., "Automated Coin Toll Service: Overall Description and Operational Characteristics", *The Bell System Technical Journal*, vol. 58, No. 6, Jul.-Aug. 1979, pp. 1207-1223.

A. W. Kettley et al., "Operational Programs", *The Bell System Technical Journal*, vol. 49, No. 10, Dec. 1970, pp. 2640-2643.

H. M. Gebhardt et al., "Electronic Charge Computation with Immediate Announcement in the Las Vegas Toll Center", *Colloque International de Commutation Electronique*, Paris, 28 Mar. $\propto$ 2 Apr. 1966, pp. 810-819.

*Primary Examiner*—Michael J. Tokar
*Assistant Examiner*—Lawrence Fess
*Attorney, Agent, or Firm*—Werner Ulrich

[57] ABSTRACT

A method and apparatus for calculating charges for telephone calls in real time. The operator assistance switch connected to an originating telephone customer recognizes that a call is one which requires an immediate calculation of charges. Such calls include coin calls, calls from certain types of hotel/motel private branch exchanges, calls from customers who wish to be notified as to the amount of the charge for the call they are about to place, and calls from customers requesting a rate for a call to a particular destination. The operator assistance switch generates a message including the originating and terminating directory numbers and the type of the call. The message is sent to a shared rating system which uses the parameters sent in the message to calculate charges. The shared rating system then sends a message, including the calculated charges, back to the operator assistance switch. The customer, or the hotel/-motel private branch exchange, is then notified of the amount of the charges. Advantageously, such an arrangement permits changes in the data used for calculating charges to be implemented easily and quickly because of the small number of shared rating systems whose tubular data must be updated. Advantageously, changes in charging algorithms can be made independently of other program changes in operator assistance switches and can be made in one place for a number of different types of operator assistance switches.

57 Claims, 7 Drawing Figures

FIND CHARGE DETERMINATION DATA

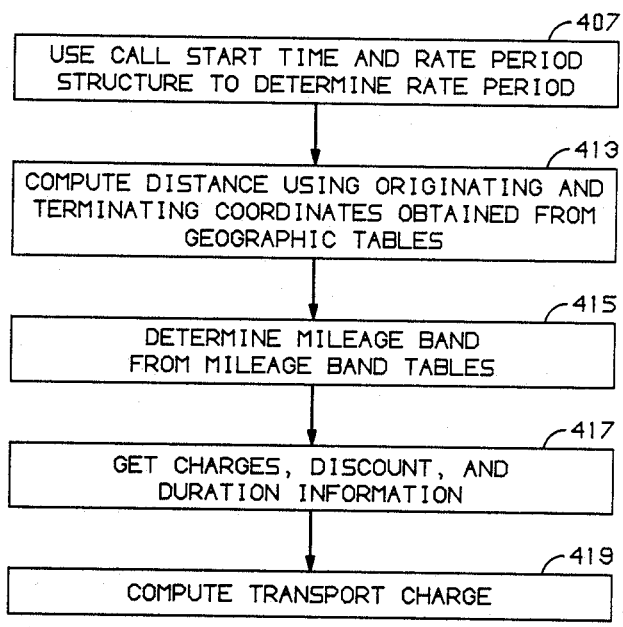

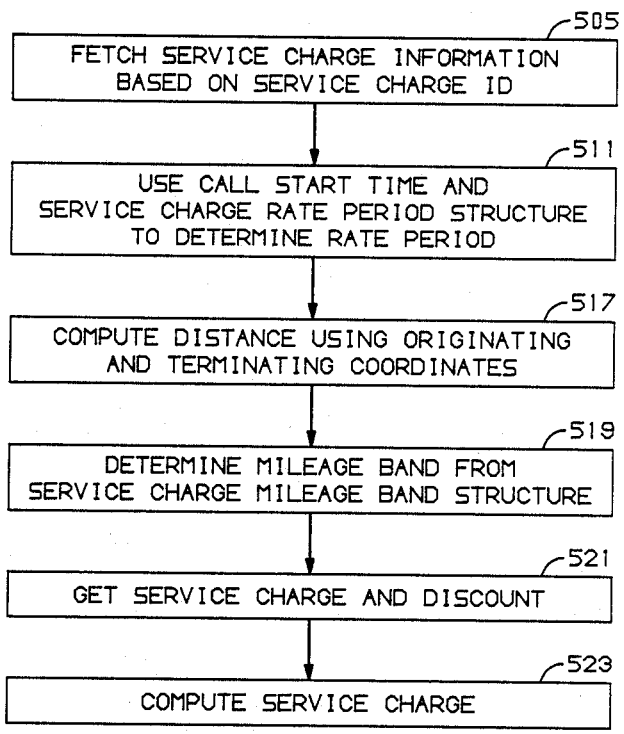

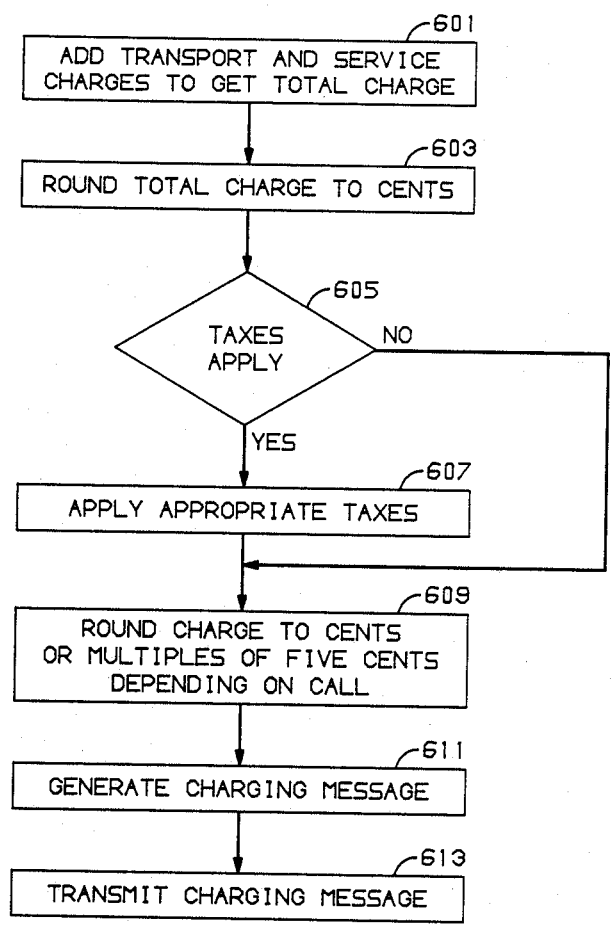

SHARED FLEXIBLE RATING OF TELECOMMUNICATIONS CALLS

TECHNICAL FIELD

This invention relates to methods and apparatus for calculating charges for telecommunications calls.

PROBLEM

Rating, i.e., calculation of charges, for telephone and data calls is usually done on a deferred basis by recording data about the call and subsequently processing this data on a separate computer. Rating can also be done on an immediate basis by calculating charges based on the originating and terminating customers' location, the type of call, and the time and length of the call. For certain calls, such as coin calls, immediate rating is necessary and is performed in a telecommunications switching system or operator assistance system that is used in setting up the call. Immediate rating systems associated with these switching systems and operator assistance systems are expensive and inflexible. In particular, they are not responsive to expected future demands resulting from competition in the provision of toll telecommunications service. These demands are likely to include many special charges for different types of calls, and many different charges for calls occurring at the same time of day of the same duration between customers separated by the same distance. Additionally, demands are expected for special short term charging arrangements, for example, for calls to New Orleans during the Mardi Gras season.

When new charges are introduced, for uniformity of customer charging treatment, they must be introduced simultaneously in all immediate and deferred rating systems serving calls affected by the new charges. For each different type of immediate rating system, a special development must be carried out to create a data processing program for controlling new methods of charging. Further, changes in data tables reflecting new charges must be introduced into each immediate rating system before the new charges become effective. The coordination of introduction of changes in data tables of all of these types of systems and the individual rating systems is complex and error prone. Individual data tables must be maintained for each rating system. Such tables must be updated in such a way that changes in the rating algorithms or the rating of particular calls are introduced simultaneously across many systems. A problem in the prior art, therefore, is that rating systems are expensive and inflexible and that the use of such systems creates an undesirable delay in the introduction of new rating algorithms and new rates for particular call type or call routes.

SOLUTION

The foregoing problems are solved and an advance over the prior art is achieved in accordance with the specific illustrative embodiment of the invention wherein a common rating system is time shared by a plurality of switching systems or switches including operator assistance switching systems. The arrangement substantially reduces the problems associated with providing individual rating facilities in each individual switching or operator assistance system. It further facilitates updating of rating data for a common group of switching and operator assistance systems served by that rating system. Resultingly, system by system updating is eliminated and delays in introducing new rates or rating algorithms are substantially reduced.

The illustrative rating system is advantageously accessed by switching and operator assistance systems through data messages sent over data links for obtaining immediate charge data for calls. The messages provide the data necessary for a program controlled processor of the rating system to calculate charges and to control their return by data messages to the requesting switching or operator assistance system. Advantageously, such charge data may comprise initial charges and period and overtime charges and period or may comprise the actual charges for the specific call. Advantageously, such an arrangement allows a limited group of rating systems to serve switching and operator assistance systems on a nationwide basis. Accordingly, a nationwide change of charges and charging methods can be implemented by updating the data memory and program of a small number of data processors. Advantageously, a small number of shared rating data bases with processors are updated without encountering the problems of attempting to update of individual rating systems in individual switching and operator assistance systems nationwide. Advantageously, a single data processing program is provided for in the rating processor to serve a variety of different types of switching and operator assistance systems. Advantageously, such an arrangement can be used to return charge data from the rating processor essentially in real time, for example, within ten seconds or less.

Messages to the rating processor for requesting charging data are illustratively transmitted using the common channel signaling system extensively deployed for exchanging call control messages among telephone switching systems. The signaling system provides an in-place, highly reliable, data communication facility for communicating between the shared rating systems and the individual switching and operator assistance systems.

The rating processor illustratively comprises data tables for calculation of charges based on the location of the calling and/or the called customer in addition to the distance between these locations. The data tables are equipped to specify different charges for the same call depending on which end originated the call and different charges for originating customers having different classes of service. A rating processor serves a large number of telecommunications switching systems serving a large region, thus reducing the cost of providing rating service to each such telecommunications switching system. Changes in charging algorithms or specific charges between two points are implemented for the entire area served by one billing processor by means of a change of a single program or a single data base. An advantage is that different common carriers having different charges for the same call are served by a common data base if the different common carriers interconnect the same originating and terminating telecommunications switching systems.

Illustratively, the tables are arranged so that different entries are associable with each office code (NXX, where N is a number from 2 to 9 and X is a number from 0 to 9) within a North American numbering plan area (NPA), and further, when necessary, within an office code. Advantageously, such an arrangement permits differential charging for calls from and to low telephone population density areas or over high traffic routes.

Charging methods for local calls vary widely over the local area served by a shared rating system. It is also expected that charging methods for toll calls will vary widely with many exceptions to a number of basic arrangements. The number of possible combinations of pairs of originating and terminating office codes is astronomical so that it is uneconomical to provide for complete charging tables having an entry for each pair. In accordance with one aspect of the invention, a charge calculation arrangement is provided for serving large numbers of exceptions in both local and toll calls. Originating and terminating NPA-NXX office codes are each translated into intermediate data including a rate center number, representing a group of office codes having common charges for originating and terminating local calls, and translated into a set of originating and a set of terminating directory access keys. A directory accessed by a directory access key comprises data for accessing other data. A jurisdictional category is used to select an originating and terminating directory access key from each set. Charge access tables are then searched for local charge access data using the originating and terminating office codes and rate centers. If no local charge access data is found, charge access tables are searched for toll charge access data using the originating and terminating directory access keys. The local and toll access charge data contain a further stage of intermediate data that is used to access further tables containing specific charging amount and charging period data. The search of charge access tables is carried out using a randomized parameter generated from the search parameters, thus allowing several search parameters to be used together for searching a table for corresponding data. In one particular embodiment of the invention, the search for local charge access data is made in three stages, first using originating and terminating office codes, then originating rate center and terminating office code, then originating and terminating rate centers. Similarly, the search for toll charge access data is conducted using first both originating and terminating directory access keys, then using the originating directory access key only, then using the terminating directory access key only. Advantageously, such an arrangement is usable to handle a large number of exceptions efficiently. Advantageously, this arrangement separates local exceptions from toll exceptions, limiting the multiplicative effect of the two types of exceptions.

DRAWING DESCRIPTION

FIGS. 3-7 charts of programs executed by the rating system processor in calculating charges.

DETAILED DESCRIPTION

Figure 1:
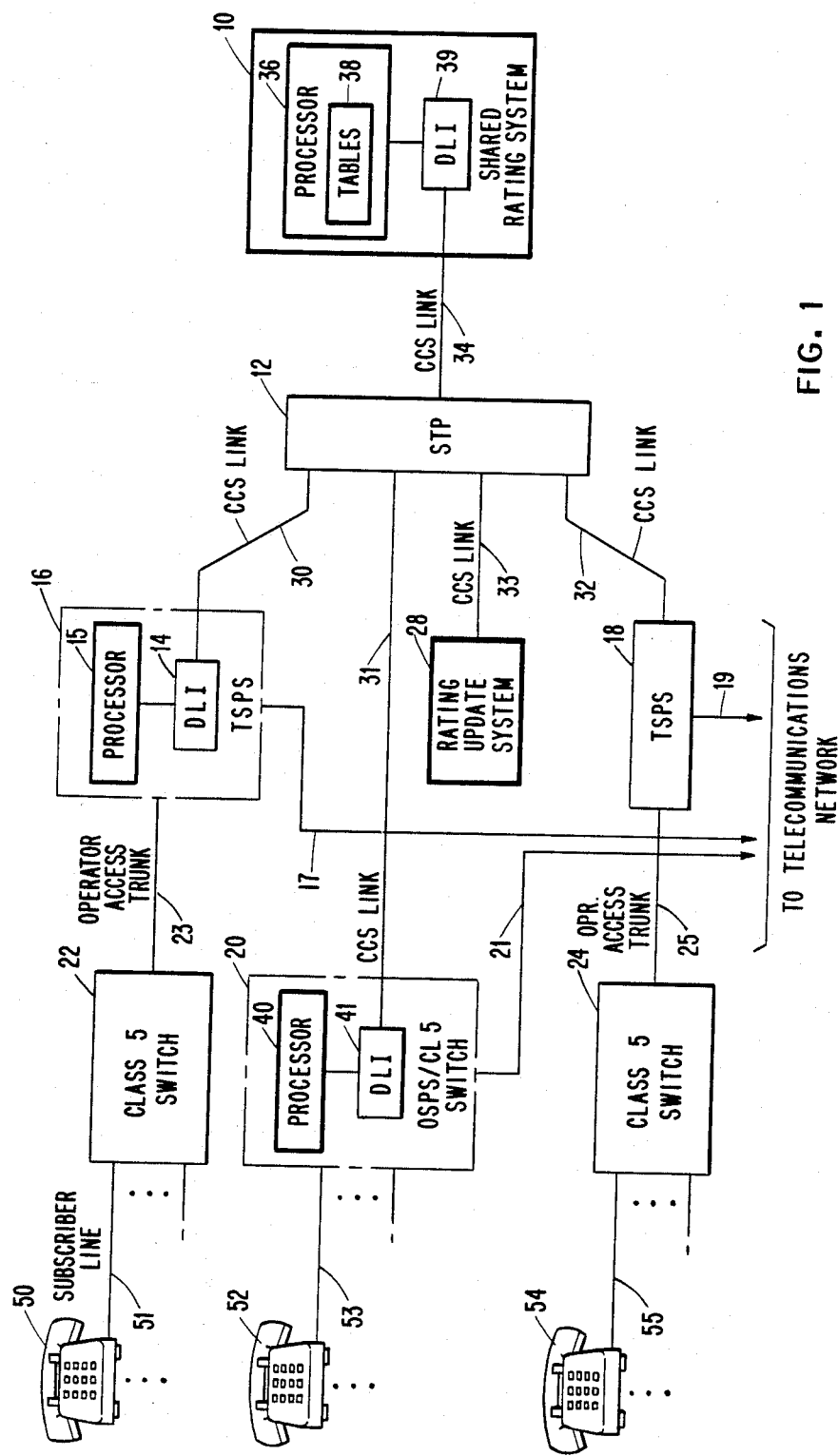
FIG. 1 is a block diagram of a group of switching systems and operator assistance systems interconnected with a shared rating system by common channel signaling facilities.

In FIG. 1 a shared rating system 10 is arranged to be accessible via data links 30,32 from operator assistance telecommunications switching systems or switches such as traffic service position systems (TSPS) 16 and 18. These systems are accessed via operator access trunks such as 23 and 25, from class 5 offices, such as 22 and 24, which are connected via subscriber lines such as 51 and 55 to telephone subscriber stations, such as 50 and 54.

Further, combined telecommunications switching systems or switches which serve as operator assistance systems and which also carry out class 5 office functions, such as the Operator Service Position System (OSPS) 20 connected to telephone station 52 via subscriber line 53, also access the shared rating system 10 via data link 31. Switches 16, 18, and 20 are connected to a common carrier public telecommunications network (not shown) by trunks 17, 19, and 21.

The shared rating system 10 is accessed whenever there is a need to rate and calculate charges for a telephone call. Immediate rating is needed for coin calls, since a customer must be requested to deposit the appropriate sum of money immediately; for time and charge calls, when a customer has made a specific request to be informed of the charges incurred in making a particular call; for auto charge quotation system (ACQS) calls, such as hotel/motel calls in which the hotel/motel is immediately informed of charges so that a customer may be presented with an up-to-date bill at checkout time; and for requests for a charge quotation if a customer asks how much he would be charged for making a particular call of a particular length. For these classes of calls, operator assistance systems, such as the Traffic Service Position Systems 16 and 20 (TSPS) manufactured by AT&T Technologies, Inc. (see R. J. Jaeger et al., U.S. Pat. No. 3,484,560), provide facilities for immediate calculation of telephone charges.

Some modern class 5 offices or switches, i.e., switches connected directly to customers, have operator services functions built into the office, so that no separate traffic service position system is required. For example, the 5ESS TM telecommunications switching system or switch manufactured by AT&T Technologies, Inc. offers operator services from operator positions connected to the switch. This is described, for example, in N. X. DeLessio et al., "An Integrated Operator Services Capability for the 5ESS Switching System", ISS '84, (Florence), Session 22C, Paper 3, May 1984, pp. 1-5. Such a switch is indicated in FIG. 1 as Operator Services Position System (OSPS)/Class 5 switch 20, which is illustratively connected to a subscriber telephone station 52.

Recently, a need has arisen to implement greater variety of telephone charging methods. Immediate charge calculations for this greater diversity of telephone charges require use of a complex charging program that uses large tables of data for calculating telephone charges. These tables are more economically stored and accessed on a shared basis, instead of being duplicated many times in each traffic service position system or operator service position system. By sharing the rating process, only one set of tables need be updated whenever a change in the charging algorithms is made. The complex rating program for one rating processor is arrangeable for serving the rating needs of a variety of operator assistance systems, thus avoiding the necessity of designing a plurality of rating programs, one for each type of operator assistance system. Changes in the rating calculation program can also be made more readily in the rating processor 36 since there is no danger that flaws in such a program may affect completion of large numbers of calls; such a danger exists in introducing program changes into an operator assistance system, which therefore requires much more extensive program testing before program changes can be introduced. Advantageously, both small and large changes can be introduced more rapidly and with less cost through the use of a shared rating system accessible from a variety of switches.

The shared rating system 10 is accessed through a common channel signaling (CCS) system, including CCS data links and signal transfer points (STP's). The CCS system interconnects OSPS's and TSPS's with each other and with other switching systems for the purpose of transmitting telephone call control and data messages. The shared rating system 10 exchanges messages with TSPS 16 and 18 and with OSPS 20, via CCS links 30, 32 and 31, respectively, and STP 12 and CCS link 34. The processors of the TSPS and OSPS, such as processors 15 and 40 of TSPS 16 and OSPS 20, access data links, such as data links 30 and 31, via data link controllers 14 and 41, respectively. This arrangement allows OSPS's, TSPS's and rating systems to exchange messages reliably and rapidly.

Shared rating system 10 comprises a processor 36 which can be any data processor that comprises memory for an extensive set of tables 38. Initially, 8 megabytes appear to be adequate storage for a shared rating system, but this number is likely to grow as more demands are placed on the rating system. A rating update system 28 is also provided for generating data messages for updating the tables 38 in shared rating system 10; the rating update system 28 is connected to the shared rating system by data links 33 and 34 and STP 12.

The blocks of FIG. 1 with heavy outlines are those that have been added or changed to provide shared rating service. As discussed hereinafter with respect to FIG. 2, the control program of switch 20 and TSPS's 16 and 18, contained in the processor of such systems, such as processor 15 of TSPS 16 and processor 40 of OSPS 20 is modified to provide for use of the shared rating system. The shared rating system 10 itself, comprising a processor 36 and tables 38, and a data link interface 39 for interfacing between processor 36 and data link 34, is also new since tables for immediate rating were formerly provided in the TSPS's 16 and 18. The rating update system 28 is an operations support system comprising a program to generate the update messages needed to update the needs of shared rating system 10.

In this embodiment of the present invention, the United States is divided into four regions. Four shared rating systems are provided, one for rating traffic from each of the four regions. Each of these shared rating systems is provided with a complete set of terminating data tables, and a set of originating data tables for the region being served. Alternatively, each of the shared rating systems could be provided with more complete originating tables in order to serve overflow traffic from another region or in order to serve as a back-up in case of failure of one of the other shared rating systems.

While this description deals with calls which require charging data essentially in real time, for example, for most calls within ten seconds, and for many calls within a second, the basic arrangement can also be used for calculating charges for other calls. Such an arrangement would mean that only a single program is required for all charging of all calls. In that case, other class 5 switches such as 22 and 24 would also access shared rating system 10 by data links (not shown). The rating processor can be arranged to process charges for some calls essentially immediately, for example, in less than ten seconds, and to defer the processing of charges for other calls.

Figure 2:
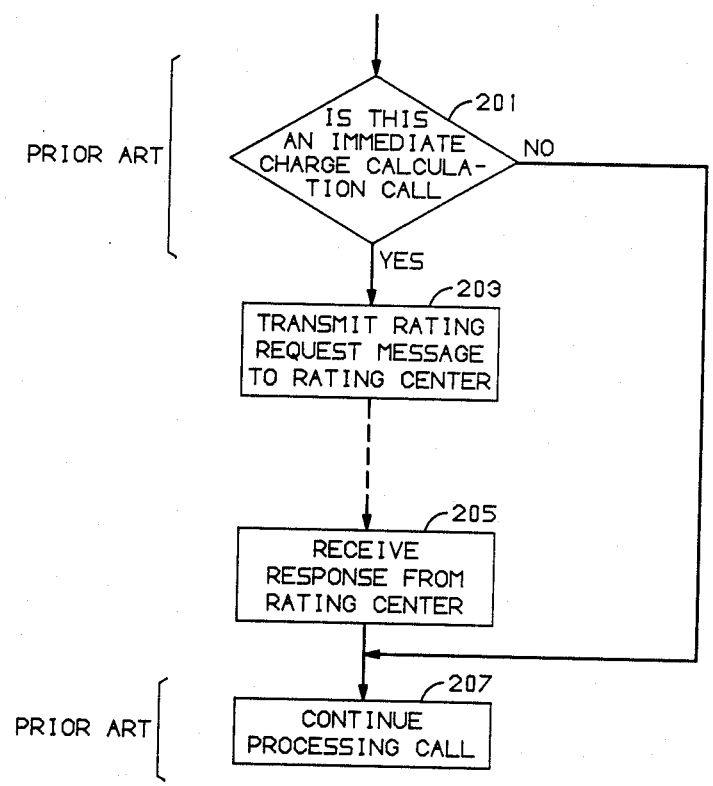
FIG. 2 is a flow chart showing program changes for controlling an operator assistance system.
Figure 3:
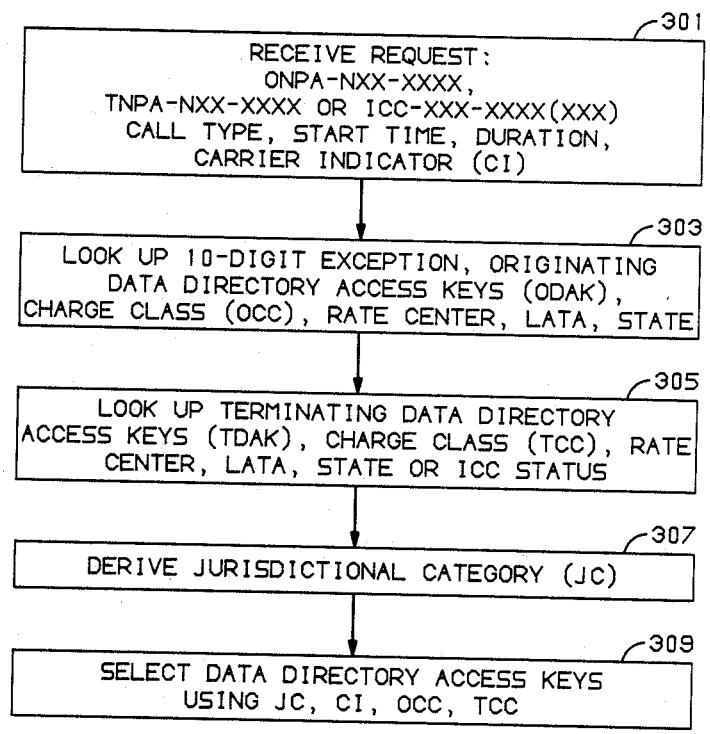

FIG. 2 illustrates a portion of the call processing program of a TSPS. When appropriate information is gathered about the call, test 201 is performed in order to make a decision whether this call is one of four types previously described requiring immediate charge calculation. If not an immediate charge calculation call, normal call processing is continued (action box 207). However, for immediate charge calculation, a message describing the rating request is prepared and transmitted through CCS to the shared rating system 10 (action box 203). If rating were to be performed for other calls also, the rating request message would also be transmitted for these calls. System 10 calculates charges in accordance with flow charts of FIGS. 3-6 and data relationships described hereinafter in Table I and generates a response message for return to the TSPS.

Upon receipt of that message (action box 205) TSPS has the data necessary to continue call processing and to disseminate the charging data to those destinations which may require this data. For example, the TSPS may have data identifying the amount of an initial coin charge, and the period and amount of overtime charges and that data permits the TSPS to control a coin call. A similar program is provided among the programs for offering the OSPS feature in a 5ESS switch. Another example of such charging data dissemination of such is that the charge information is displayed at an operator position for the operator to inform a customer. For some applications of ACQS, a message containing charging data may be sent over a data link to a hotel/motel.

When a coin call is processed, the initial request message is sent to rating system 10 which responds by giving initial and overtime period, and initial and overtime charge data. Subsequently, when the calling customer disconnects, a new total charge request message is sent to rating system 10 and the total charge for the call are computed. This message is sent back to the TSPS for subtracting accumulated coin deposits already made by the customer, in order to request the final customer deposit.

FIGS. 3-7 are flow charts describing the process executed by processor 36 (FIG. 1) of rating system 10. Processor 36 receives a request for rating data (action block 301). The request includes the originating customer number which includes the originating numbering plan area code (ONPA), three-digit office code (NXX), and four-digit line number (XXXX). The request also includes the terminating customer's directory number, which for a domestic or non-domestic call in the North American numbering plan area, consists of a terminating numbering plan area code (TNPA), terminating office code, and terminating line number, and for an international code outside the North American numbering plan area, includes an international country code (ICC) followed by a three-digit intra-country city code (XXX), followed by a variable number of digits depending on the length of the international country code. The request message also identifies the type of the call (whether station-to-station, person-to-person, directory assistance, calling card, or request for operator services such as busy line verification). Also specified is the start time of the call and, if the call has been completed, its duration and the identification of the carrier used in setting up the call.

In response to a request message, the shared rating system processor 36 looks up the originating data directory access key (ODAK) set, originating charge class (OCC) set, originating rate center (ORC), whether or not there is a ten-digit exception, in which case alternate ODAK and OCC sets are found, and the originating local access transport area (LATA) and originating state (OSTATE) (action block 303). The latter two factors are necessary to determine the jurisdictional category (JC) of the call because rates are determined by different rate making administrations and different carriers depending on the identification of the originating customer's state and local access transport area. The ten-digit exception table search option is made available to provide, for example, for different charges from certain types of customer equipment, such as automatic credit card reading stations. More generally, the ten-digit exception arrangement can be used to provide different charging according to an originating class of service without requiring modification of equipment to transmit the class of service from an originating telecommunications switch.

Next, the terminating data directory access keys (TDAK) set, charge class (TCC) set, rate center (TRC), LATA (TLATA), state (TSTATE) and whether or not this is an international call are determined from the TNPA-NXX or ICC-XXX (action block 305). In this embodiment no terminating ten-digit exception search is made so that no special rates can be applied to a particular terminating customer. Alternatively, if a service were to be offered which required different charges for selected terminating customers within an office code, such a ten-digit exception search could readily be implemented.

Next, the jurisdictional category is determined from the originating and terminating LATA and state and from the determination of whether this is an international call (action box 307). Finally, a specific ODAK, OCC, TDAK, and TCC is selected from the ODAK, OCC, TDAK, and TCC sets using the jurisdictional category and the carrier indicator (CI) (action box 309).

Figure 4:
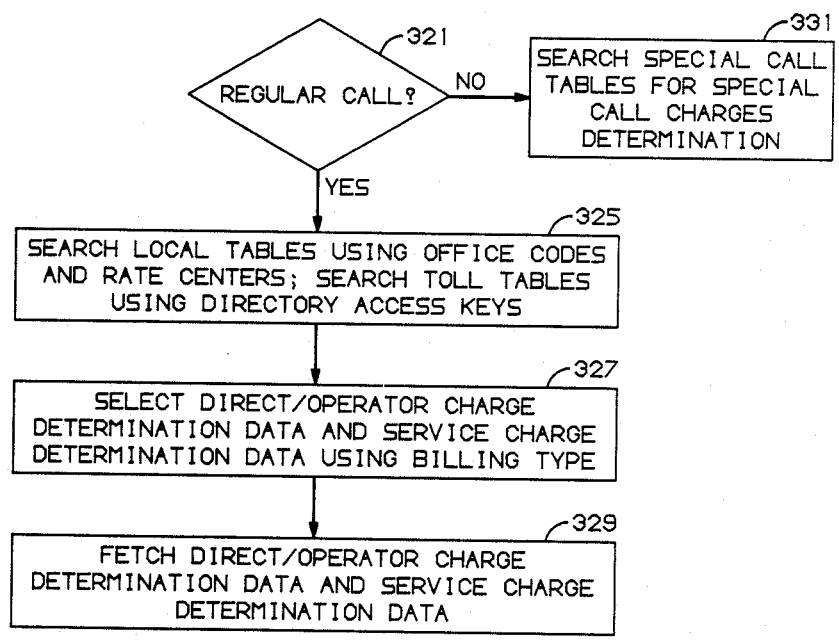

FIG. 4 illustrates the process of finding charge determination data. First, test 321 determines whether this is a regular call, such as a station-to-station call or person-to-person call, or a special call, such as a directory assistance or busy line verification call. If test 321 indicates that this is a regular call, then a two phase search is made. First, a search is made of tables associated with local calls and this search is made using the originating and terminating customers' NPA-NXX and rate centers (action box 325). If no entry is found corresponding to these search parameters, then a separate toll table is searched using the directory access keys. In the case of an international call, no local table is searched. The reason for using directory access keys for toll calls and office codes and rate centers for local calls is that a large number of special exceptions exist at the local level for local calls and if the directory access keys had to consider all of these exceptions, the number of directory access keys would multiply inordinately. By separating the search mechanism for local calls from the search mechanism for toll calls, the number of exceptions in each category is kept to a reasonable number and the total number of exceptions is the sum, not the product of local and toll exceptions. In action box 327, a particular set of directory operator charge determination data and service charge determination data is selected from a group of sets of such data by using the billing type of a call. Billing type includes factors such as station-to-station or person-to-person and credit card and coin. In action box 329, the specific direct dialed or operator charge determination data and service charge determination data is accessed.

For the case of a special call, the special call tables are searched for special call charge determination (action box 331). Because special call charges tend to be somewhat more uniform, it is not necessary to have a separate search of local tables and toll tables, but a search of a single table is adequate for determining special call charge data; otherwise the process of accessing special call charge data is similar to the process of accessing regular call charge data.

The tables which contain call charge data and the data required for accessing such data are interrelated in a complex fashion which is summarized in Table I. The flexible rating system described herein is flexible in a number of ways. First, it is flexible in allowing different overall levels of charges, to differentiate between calls among customers for whom access costs should be relatively low, for example, central city customers, and calls among customers whose access costs are higher such as rural customers. Secondly, it is flexible to allow for different rate schemes applied by different rate making administrations in different states; for example, it can differentiate according to region among the set of holidays recognized, the amount of discount for different rate periods, the timing of different rate periods, and the method of rounding charges. The first type of flexibility is introduced through the use of originating and terminating charge classes which allow different levels of charges to be applied to customers making calls that are subject to the same general rate scheme. The second type of flexibility is achieved through the use of directory access keys and through a separate search of tables for local and toll calls.

Directory access keys for the customers of a particular NPA-NXX code are grouped in sets, the selection among the keys in a set being made on the basis of a jurisdictional category and a carrier identification. The jurisdictional category differentiates among the different types of calls that a particular customer may make because these calls are subject to charges set by different rate making administrations. The carrier identification has a similar function since the rating scheme has the flexibility to allow different carriers to set different charges.

The rating scheme described herein is also flexible in serving different billing types and in considering the degree of automation of provision of these billing types. For example, it may be desirable to have different transport charges as well as a different service charge for person-to-person calls. Since one of the functions of the rating system is to calculate charges even for call types which do not require immediate rating (e.g., for quoting charges), the charges for simple customer dialed calls not requiring operator assistance are also calculated. In order to provide this flexibility, the combination of the call characteristics and the degree of automation is used to select an appropriate set of charging and duration tables from within groups of such tables.

TABLE I

| INPUT | OUTPUT | METHOD OF DERIVING OUTPUT |
| --- | --- | --- |
| (1) ONPA—NXX | OSTATE, OLATA, ORC, OAC | LT |

TABLE I-continued

| | | | |
|---|---|---|---|
| (2) | ONPA−NXX or ONPA−NXX−XXXX | OCC set, ODAK set | SH,LT |
| (3) | TNPA−NXX or ICC or ICC−XXX | TRC, TAC, TLATA, TSTATE, TCC set, TDAK set | LT |
| (4) | OSTATE+TSTATE+OLATA+TLATA +ICC+TNPA (non-domestic) | JC | CA |
| (5a) | CI+JC+OCC set | OCC | SV |
| (5b) | CI+JC+TCC set | TCC | SV |
| (5c) | CI+JC+TDAK set | TDAK | SV |
| (5d) | CI+JC+ODAK set | ODAK | SV |
| (6a) | ORC | OC | LT |
| (6b) | TRC | TC | LT |
| (7) | OC+TC+OAC+TAC | mileage | CA |
| (8a) | JC+CI | DG | ST |
| (8b) | DG+CC | DS | ST |
| (9a) | If DS = Regular, ONPA−NXX+TNPA−NXX, ORC+TNPA−NXX, ORC+TRC | BDA set for Local | SH |
| (9b) | ODAK+TDAK, TDAK, ODAK | BDA set for Toll | SH |
| (10) | BDA set+BT | DOCDD, SCDD | SV |
| (11a) | DOCDD | DOSCD | ST |
| (11b) | DOSCD | RPDI, MBDI | ST |
| (12) | MBDI+OCC | MBD | ST |
| (13) | MBD+mileage | MB, CST | CA,ST |
| (14) | RPDI+date, day of week, time | RPS, discounts, RPC, RPD | CA,ST |
| (15) | DOSCD+SF | ADD | ST |
| (16) | ADD+AD | ADCI, ADDI | LT |
| (17a) | DOSCD+ADCI | CPTI | ST |
| (17b) | OCC+MB+RPC | CP | SH |
| (18a) | DOSCD+ADDI | DPTI | ST |
| (18b) | MB+RPD+OCC | DP | SH |

Method Abbreviations

| | |
|---|---|
| CA | Calculate from data |
| LT | Look up in table |
| SH | Search over a table |
| ST | Select one of a group of tables |
| SV | Select one of a group of values |

Parameter Abbreviations

| | |
|---|---|
| AD | Automation degree |
| ADCI | Automation degree charging identifier |
| ADD | Automation degree definition |
| ADDI | Automation degree duration identifier |
| BDA | Billing data access |
| BT | Billing type |
| CC | Call category |
| CI | Carrier identifier |
| CP | Charge parameters |
| CPTI | Charge parameter table identifier |
| CST | Charge scheme type |
| DG | Directory group |
| DOCDD | Directory/operator charge determination data |
| DOSCD | Directory/operator structure charge data identifier |
| DP | Duration parameters |
| DPTI | Duration parameter table identifier |
| DS | Directory set (within a directory group) |
| ICC | International country code |
| JC | Jurisdictional category |
| MB | Mileage band |
| MBD | Mileage band definition |
| MBDI | Mileage band definition identifier |
| OAC | Originating rate center alternate geographic coordinates |
| OC | Originating rate center geographic coordinates |
| OCC | Originating customer's charge class |
| ODAK | Originating customer's directory access key |
| OLATA | Originating customer's local access transport area |
| ONPA | Originating customer's numbering plan area |
| ORC | Originating customer's rate center |
| OSTATE | Originating customer's state |
| RPC | Rate period charges accessing parameter |
| RPD | Rating period duration accessing parameter |
| RPDI | Rating period definition identifier |
| RPS | Rate period scheme |
| SCDD | Service charge determination data |
| SF | Service features |
| TAC | Terminating rate center alternate geographic coordinates |
| TC | Terminating rate center geographic coordinates |
| TCC | Terminating customer's charge class |

TABLE I-continued

| | |
|---|---|
| TDAK | Terminating customer's directory access key |
| TLATA | Terminating customer's local access transport area |
| TNPA | Terminating customer's numbering plan area |
| TRC | Terminating customer's rate center |
| TSTATE | Terminating customer's state |

For each step, Table I shows input parameters and data used to obtain output parameters and data, and the method of deriving the output. The five methods of deriving this output are as follows:

CA—Make a calculation from data. For example, the calculation of mileage from geographic coordinates is one such case. Other calculations are the result of performing logical operations on available data: for example, OSTATE and TSTATE, and OLATA and TLATA are compared to calculate JC.

LT—Look up in an ordered table. The table has N entries and is searched with a parameter varying from 0 to N−1 or from 1 to N. The appropriate entry from the table is selected directly from the value of the input parameter.

SH—Search over a table. A search is made, for example, by the technique of generating a hash sum parameter from the input parameters and addressing the table using this hash sum parameter, if that entry exists corresponding to the input parameters, then the corresponding data is obtained. Note that in using the hash sum parameter, all of the input parameters are used for accessing the output. This technique is used when the number of possible values of the input parameter far exceeds the number of entries in the table. Note that whereas in this specific embodiment certain searches are indicated as being LT, it is possible that for other applications a search approach may be more appropriate. Note also that the technique of searching tables using hash sum parameters is well known in data base access systems.

ST—Select one of a group of tables. A group of M tables exists and the input parameter is used to select one of these M tables. That table is then subsequently used for further data searches.

SV—Select one of a group of values. In a previous step, a group of K values of a particular parameter was found. The search parameter is then used to select one of these K values.

The series of steps of Table I will now be described. In step 1, a first table accessed using the originating NPA-NXX code yields the identification of the originating state (OSTATE), originating local access transport area (OLATA), originating rate center (ORC), and originating alternate geographic coordinates (OAC) whose function are described hereinafter with respect to the calculation of mileage. In step 2 the ONPA-NXX or, on an exception basis, the full originating directory number (ONPA-NXX-XXXX) is further used to access a set of originating charge classes (OCC set) and a set of originating directory access keys (ODAK set).

In step 3, the terminating NPA and office code (TNPA-NXX), or the international country code (ICC) and, on an exception basis, the international country code and a three-digit city code (ICC-XXX), are used to access a terminating rate center identification (TRC), terminating alternate coordinates (TAC), the terminating local access transport area (TLATA), the terminating state (TSTATE), the terminating charge class set (TCC set), and the terminating directory access key set (TDAK set). The functions of these terminating parameters are similar to the functions of the originating parameters but refer to the terminating customer location and charge selection data.

In step 4, the jurisdictional category (JC) is derived from the values of OSTATE, TSTATE, OLATA, TLATA, or, where appropriate, ICC or non-domestic TNPA. In steps 5a through 5d, the JC is used together with a carrier identification (CI), for example, AT&T Communications or a local carrier, to select one OCC, one TCC, one ODAK, and one TDAK from the sets derived in steps 2 and 3. The JC is used because different rate making administrations set rates for different categories of calls. Interstate calls are regulated by the federal government whereas intrastate calls are regulated by the state governments. Intra-LATA calls are frequently under the jurisdiction of a different body than inter-LATA calls. International calls are regulated by the federal government with the agreement of other foreign countries. Consequently, the method of charging is usually different for a different JC. Similarly, different carriers are likely to have different charges so that a different directory of charges is accessed depending upon which carrier is used for transporting a telephone call. Since there is only one local carrier in any local area, a single value of CI can be used unambiguously to represent the local carrier for any location.

In Steps 6a and 6b, the ORC derived in step 1 and the TRC derived in step 3 are used to look up originating geographic coordinates (OC) and terminating geographic coordinates (TC). In Step 7, the OC and TC plus OAC derived in step 1 and TAC derived in step 3 are used to calculate the mileage between customers. OAC and TAC, when available, are used for calculating distances when the distance between OC and TC is in excess of 40 miles, so that, for example, the same distance is calculated for all calls between originating and terminating customers anywhere within the cities of Chicago and New York, respectively.

In step 8a, JC and CI select one group of directories among different directory groups, one such group being provided for each of the possible values of JC and CI. A directory is a collection of tables which contain data for accessing other tables. Within a directory group, a call category is used to fetch a directory set, one such set being provided for each call category (step 8b). The call category is restricted to either regular, in which case the directory set consists of a local and a toll directory, or special, in which case the directory set is restricted to special directories; special directions are used for such special types of calls as a busy line verification, directory assistance calls, or emergency interrupt calls. In this description, only local and toll call rating is described, since the rating for directory assistance and busy line verification is a simpler version of the rating arrangements required for local and toll calls.

If the call category is regular, the local directory is searched first in step 9a. The local directory is searched successively for an entry corresponding to the ONPA-NXX and TNPA-NXX, then the ORC and TNPA-NXX, and the ORC and TRC. The order of search simplifies handling exceptions. The narrowest exceptions are between ONPA-NXX and TNPA-NXX; broader exceptions are between ORC to TNPA-NXX; the broadest local directory search parameter is between ORC and TRC. If the call is not in the local directory, implying that the call is a toll call, then the toll directory is searched (step 9b). The order of exceptions for the toll directory requires that this directory be first searched using the ODAK and TDAK; then only TDAK, and finally only ODAK. The result of a successful search of one of the directories is a billing data access (BDA) set.

A billing type (BT) number, indicative of the type of the call such as station-to-station, person-to-person, credit card, selects a direct/operator charge determination data set (DOCDD) and a special charge determination data set (SCDD) from the BDA set (step 10). DOCDD is used to select the directory/operator structure and charge data (DOSCD) tables (step 11a). DOSCD is used to select a rate period definition identifier (RPDI) and mileage band definition identifier (MBDI) (step 11b). MBDI and OCC are used to select a specific mileage band (MBD) definition table (step 12).

From MBD and the mileage the mileage band (MB) and the charge scheme type (CST) are found (step 13). The mileage band definition table is accessed by comparing the calculated mileage with the range of mileages for each band until a band is found whose range includes the calculated mileage. The mileage band definition table specifies the mileage band (MB) and a charge scheme type (CST). CST specifies whether the charge is to be determined by the time that the call started (fixed rate billing), is to be varied according to the period of different parts of the call (rate period specific billing), or is to be flat.

The RPDI, found in step 11b, is used to select a rate period definition table. This rate period definition table plus the date (to identify holidays), day of the week and time of the call is used to find the rate period scheme (RPS)(step 14). The rate period definition table is searched until a period that includes the call start time and day of the week or day type is found. RPS specifies the discounts, if any, applicable to a period, a rate period charges (RPC) accessing parameter, and a rate period duration (RPD) accessing parameter. The rate period definition table also provides the time of the end of the selected rate period so that an added calculation may be made in case a call overlaps two rating periods and the charge type specifies rate period specific billing.

Charges are also a function of the manner in which a call is completed, described herein as automation degree (AD). The service features (SF) (including such items as person-to-person, calling card, coin, time and charge) are used with the DOSCD to find an automation degree definition (ADD) table (step 15). The ADD table is then accessed using AD to find an automation degree charging identifier (ADCI) and an automation degree duration identifier (ADDI) (step 16), to be used in accessing charging and duration parameters.

Finally, the charge and duration data are accessed in a table, selected using the DOSCD and ADCI, (step 17a), and using the MB, RPC, and OCC (or TCC for collect calls) to search for the charging parameters (CP) (step 17b), i.e., the charges for the initial period and for overtime periods. Similarly, the DOSCD and ADDI is used to select a table (step 18a) and within that table, MB, RPD and OCC are used to search for the duration parameters (DP) (step 18b), i.e., the length of the initial period and of the overtime period. Given the length of the call, CP, DP, discounts, and the call type (for calculating special charges) calculation of charges for a call can be performed as described further in FIGS. 5–7.

FIG. 5 illustrates the process of computing transport charges. Action box 407 indicates that the call start time, day of week and date (for determining special days such as holidays) is used to determine the rate period. The distance is computed using the originating and terminating coordinates and the well-known distance calculation algorithm which has been used for the past decade in TSPS (action block 413). The computed distance is then converted into a mileage band from mileage band definition tables (action box 415). The basic charge, discount and duration information is then accessed as described above with respect to Table 1, steps 14–18, (action box 417). The actual transport charge is then computed (action box 419), using the charge rate and the duration of the call.

FIG. 6 illustrates the process of computing service charges. Service charges include charges for special operator services such as person-to-person. The service charge information, based on the service charge identifier, is fetched (action box 505). The call start time is used in conjunction with the service charge rate period structure to determine the rate period (action box 511) in much the same way as the rate period is determined for transport charges. The distance is computed, using the originating and terminating coordinates (action box 517), and the mileage band is determined from the service charge mileage band structure (action box 519), again in much the same way as the mileage band is determined for transport charges. If the mileage has been previously calculated, this calculation need not be repeated, but the mileage band must still be derived for service charges. With the rate period and the mileage band now available, the service charge identifier can be used to obtain service charge and discount factors (action box 521). From these factors, the service charge is computed (action box 523).

FIG. 7 illustrates the process of computing total charges. The transport and service charges are added to get the total charge (action box 601). This total charge is rounded to the nearest cent (action box 603). A test is made, based on data supplied by the rate tables for most types of calls and by the originating switch for ACQS calls, as to whether taxes apply (test 605). For example, taxes are not included in quoted telephone charges, so that the taxation portion of the calculation is bypassed on a call to find out the rate for a call. If taxes apply, the appropriate taxes, based on the rounded charges are added to the charges (action block 607). This sum is, in turn, rounded to the nearest cent, or the nearest multiple of five cents (for coin calls) (action box 609). The charge data is then formatted into a message (action box 611) for transmission back to the office that requested the charging data (action box 613).

The customer's class of service does not affect the charge as described herein, and is not, in the preferred embodiment of the invention, included in the message. As noted with respect to action block 303, FIG. 3, the ten-digit exception table can provide the equivalent of originating class data to modify charges. However, if new types of services are introduced, wherein customers receive discounts for broad classes of calls in return for payment of a flat monthly fee, these discounts can be incorporated in the rating process by sending the customer's class of service in the rating request message and by applying the appropriate discount factor based on this class of service during the process of calculating charges. More complex arrangements could also be made available by introducing the customer's class of service into the process of accessing the charge determination data or charging parameters.

Changes in tables 38 of rating system 10 are introduced via rating update system 28 connected to the shared rating system through the common channel signaling links. These changed tables are initially prepared for test use and tested using a test data request message which specifically requests that the alternate table be accessed instead of the standard table. The answer messages are then checked to ensure that they are consistent with the requested change. Finally, an activation message to rating system 10 causes the revised tables to become activated and placed into service.

It is to be understood that the above description is only one of preferred embodiment of the invention. Numerous other arrangements may be devised by one skilled in the art without departing from the spirit and scope of the invention. The invention is thus limited only as defined in the accompanying claims.

What is claimed is:

1. A method of deriving call charge data for a customer telecommunications call, comprising the steps of:
receiving a first data message comprising source, destination, and billing type parameters of said customer call from one of a plurality of telecommunications switching systems to a data base system;
in response to said first data message, calculating numerical call rating data for said customer call, from said source, destination, and billing type parameters using data tables of said data base system;
transmitting a second data message, comprising said numerical call rating data information, to said one telecommunications switching system;
wherein said source parameter comprises at least part of an originating directory number of an originating customer and said destination parameter comprises at least part of a terminating directory number of a terminating customer;
wherein said data tables comprise source tables for translating between said at least part of said originating directory number and first intermediate data and destination tables for translating between said at least part of said terminating directory number and second intermediate data;
wherein said step of calculating numerical call rating data comprises the step of accessing third intermediate data comprising charging parameters for calculating said call charge data using said first and second intermediate data and said billing type parameter.

2. The method of claim 1 further comprising the step of notifying a customer of charge data derived from said rating data, for said customer call.

3. The method of claim 1 further comprising the step of:
recording charge data derived from said rating data, for said customer call at said switching system.

4. The method of claims 2 or 3 wherein said data tables further comprise an auxiliary table for storing alternate values for part of said first intermediate data, and said at least part of said originating directory number comprises an originating area code, originating office code and an originating line number within said originating office code, wherein said step of calculating numerical call rating data further comprises the steps of:
accessing said source tables using said originating area code and originating office code to find first intermediate data comprising a first intermediate value;
testing whether said first intermediate value indicates an exception possibility;
accessing said auxiliary table using said line number when an exception possibility is indicated in said testing step; and
substituting a second intermediate value for said first intermediate value of said first intermediate data when said second intermediate value is found in said auxiliary table.

5. The method of claims 2 or 3 wherein said step of calculating numerical call rating data further comprises the step of deriving a jurisdictional category from said first and said second intermediate data for use in accessing, said third intermediate data.

6. The method of claim 5 wherein said first intermediate data comprises the identification of an originating state and said second intermediate data comprises an identification of a terminating state, and wherein said step of deriving a jurisdictional category comprises the step of testing whether said identifications of said originating state and said terminating state are for the same state.

7. The method of claim 5 wherein said first intermediate data comprises the identification of an originating local access transport area (LATA) and said second intermediate data comprises the identification of a terminating LATA, and wherein said step of deriving a jurisdictional category comprises the step of testing whether said identifications of said originating and said terminating LATA's are for the same LATA.

8. The method of claim 5 wherein said step of calculating numerical call rating data further comprises the step of accessing a table of billing data access set parameters using said jurisdictional category and at least one of said source parameter, destination parameter, first intermediate data, and second intermediate data.

9. The method of claim 8 wherein one of said billing data access set parameters comprises a mileage band definition parameter, wherein said first intermediate data and said second intermediate data comprise originating and terminating customer location data, respectively, wherein said step of calculating numerical call rating data further comprises the steps of:
calculating the distance between the originating customer location, based on said originating customer location data, and the terminating customer location, based on said terminating customer location data;
accessing a mileage band definition table using said mileage band definition parameter;
determining a mileage band number from said distance and said mileage band definition table; and
using said mileage band number to access rate table data for calculating said numerical call rating data.

10. The method of claim 9 wherein said step of calculating numerical call rating data comprises the step of calculating service charge data comprising the steps of:
accessing a table of service charge access set parameters using said jurisdictional category to find a service charge mileage band definition parameter;

accessing a service charge mileage band definition table using said service charge mileage band definition parameter;

determining a service charge mileage band number from said distance and said service charge mileage band definition table; and accessing a service charge rate table, using said service charge mileage band number, to obtain service charge parameters for calculating said service charge data.

11. The method of claim 8 wherein said first intermediate data comprises an originating charge class and wherein said step of accessing said third intermediate data comprises the step of accessing said third intermediate data using said originating charge class to obtain said charging parameters.

12. The method of claim 5 wherein said step of calculating numerical call rating data further comprises the step of deriving a carrier indicator from the contents of said first data message for use in accessing said third intermediate data.

13. The method of claim 8, wherein said first intermediate data comprises an originating access key and said second intermediate data comprises a terminating access key, wherein said step of accessing a table of billing data access set parameters comprises the step of:

(a) accessing said table of billing data access set parameters using said originating access key and said terminating access key.

14. The method of claim 13 wherein said step of accessing a table of billing data access set parameters further comprises the step of:

(b) upon failing to find a billing data access set parameter in step (a), accessing said table of billing data access set parameters using said terminating access key.

15. The method of claim 14 wherein said step of accessing a table of billing data access set parameters further comprises the step of:

(c) upon failing to find a billing data access set parameter in steps (a) and (b), accessing said table of billing data access set parameters using said originating access key.

16. The method of claim 5 wherein said first intermediate data comprises an originating rate center number and said second intermediate data comprises a terminating rate center number, further comprising the steps of:

(a) accessing a table of billing data access set parameters using at least one of said at least part of said source parameter and said at least part of said destination parameter; and (b) if no billing data access set parameter is found in step (a), accessing said table of billing data access set parameters using said originating rate center number and said terminating rate center number.

17. A rating system for calculating charges for a telecommunications call from one of a plurality of telecommunications switching systems comprising:

a processor storing rating tables usable for said switching systems and operable for calculating call charges therefor;

a data link interface means connectable to said processor for receiving a rating request data message from any one of said plurality of telecommunications switching systems, said message comprising source, destination, and billing type parameters for a customer call; and said processor being operative in response to said parameters of said charge request message for calculating call rating data using said rating tables and for transmission to said one of said plurality of switching systems for use by said one switching system for at least one of notifying a customer of a charge for said customer call and recording a charge for said customer call.

18. The rating system of claim 17 wherein said call rating data comprises an initial charge amount, the length of an initial period, an overtime period charge amount, and the length of an overtime period.

19. The rating system of claim 17 wherein said source parameter comprises at least part of an originating directory number for an originating customer and said destination parameter comprises at least part of a terminating directory number for a terminating customer.

20. The rating system of claim 19 wherein said rating tables comprise source tables for translating between said at least part of said originating directory number and first intermediate data, and destination tables for translating between said at least part of said terminating directory number and second intermediate data, wherein said first and second intermediate data and said billing type parameter are used for accessing third intermediate data, and wherein said third intermediate data comprises charging parameters for calculating said call rating data.

21. The rating system of claim 17 wherein said data link interface means is connected to a common channel signaling system for interconnecting said plurality of switching systems and said rating system.

22. A method of deriving call charge data for a customer telecommunications call that is one of the class of coin calls, automatic charge quotation calls, and time and charge calls, comprising the steps of:

receiving a first data message from one of a plurality of telecommunications switching systems to a data base system;

in response to said first data message, calculating numerical call rating data for said customer telecommunications call using data tables of said data base system; and transmitting a second data message comprising said numerical call rating data information to said one telecommunications switching system for by said one switching system for at least one of notifying a customer of a charge for said customer call and recording a charge for said customer call.

23. The method of claim 22 wherein said first data message comprises source, destination, and billing type parameters for said telecommunications call, and wherein said step of calculating charge data comprises the step of calculating the amount of the charge for said call using said source, destination, and billing type parameters.

24. The method of claim 23 wherein said step of transmitting a second data message comprises the step of transmitting said second data message via a common channel signaling system comprising a signal transfer point for switching data messages among a plurality of data links.

25. A method of deriving call charge data for a customer telecommunications call, comprising the steps of:

deriving source, destination, and billing type parameters of said customer call at a telecommunications switching system;

transmitting a message comprising said source, destination and billing type parameters from said telecommunications switching system to a data base calculating numerical call rating data for said call from said source, destination and billing type parameters using data tables of said data base;

wherein said source parameter comprises an originating directory number of an originating customer comprising an originating area code, and originating office code, and an originating line number within said originating office code and said destination parameter comprises at least part of a terminating directory number of a terminating customer;

wherein said data tables comprise source table, destination table, and an auxiliary table for storing alternate values for first intermediate data;

wherein said step of calculating numerical rating data comprises the steps of:

accessing said source tables using said originating area code and originating office code to find first intermediate data comprising a first intermediate value;

testing whether said first intermediate value indicates an exception possibility;

accessing said auxiliary table using said line number when an exception possibility is indicated in said testing step;

substituting a second intermediate value of said first intermediate value of said first intermediate data when said secod intermediate value is found in said auxiliary table;

accessing said destination tables using said at least part of said terminating directory number to find second intermediate data; and accessing third intermediate data comprising charging parameters for calculating said call charge data using said first and said second intermediate data and said billing type parameter.

26. A method of deriving call charge data for a customer telecommunications call, comprising the steps of:

deriving source, destination, and billing type parameters of said customer call at a telecommunications switching system;

transmitting a message comprising said source, destination and billing type parameters from said telecommunications switching system to a data base;

calculating numerical call rating data for said call from said source, destination, and billing type parameters using data tables of said data base;

wherein said source parameter comprises at least part of an originating directory number of an originating customer and said destination parameter comprises at least part of a terminating directory number of a terminating customer, and wherein said data tables of said data base comprise source tables and destination tables;

wherein said step of calculating numerical call rating data comprises the steps of:

accessing said source tables for translating from said at least part of said originating directory number to first intermediate data and an originating charge class;

accessing said destination tables for translating from said at least part of said terminating directory number to second intermediate data;

deriving a jurisdictional category from said first and said second intermediate data;

accessing a table of billing data access set parameters using said jurisdictional category, said first intermediate data, and said second intermediate data to locate a charge parameter table; and accessing said charge parameter table using said originating charge class to obtain rate data for calculating said numerical rating data.

27. The method of claim 26 wherein said first intermediate data comprises an originating access key and said second intermediate data comprises a terminating access key and said step of accessing a table of billing data access set parameters comprises the step of:

(a) accessing said table of billing data access set parameters using said originating access key, said terminating access key, and said jurisdictional category, (b) upon failing to find a billing data access set parameter in step (a), accessing said table of billing data access set parameters using said terminating access key and said jurisdictional category.

28. The method of claim 27 wherein said step of accessing a table of billing data access set parameters further comprises the step of:

(c) upon failing to find a billing data access set parameter in steps (a) and (b), accessing said table of billing data access set parameters using said originating access key and said jurisdictional category.

29. The method of claim 26 wherein said first intermediate data comprises an originating rate center number and said second intermediate data comprises a terminating rate center number, further comprising the steps of:

(a) accessing a table of billing data access set parameters using one of said originating rate center and said source parameter, and one of said terminating rate center and said destination parameter; and if no billing data access set parameter is found in step (a), accessing said table of billing data access set parameters using at least one of said source parameter and said destination parameter.

30. A telecommunications switching system comprising:

a stored program controlled processor comprising call processing programs for controlling customer telecommunications calls, said call processing programs comprising:

a first program to generate a first data message for requesting from a rating system shared by a plurality of telecommunications switching systems call rating data for a customer telecommunications call; and a second program responsive to a second data message from a rating system shared by a plurality of telecommunications switching systems comprising call rating data information for said customer telecommunications call for controlling dissemination of call charge derived from said rating data, for said customer telecommunications call.

31. The telecommunications system of claim 30 wherein said second program comprises a program for controlling collection of coins for a coin call.

32. The telecommunications system of claim 30 wherein said second program comprises a program for controlling transmission of data to a customer's equipment for an automatic charge quotation system.

33. The telecommunications system of claim 30 for generating data for notifying a customer of charges for a time and charge call.

34. The telecommunications system of claim 30 wherein said second program comprises a program for generating data for notifying a customer of charges for an uncompleted call specified by a customer.

35. The telecommuncations system of claim 30 wherein said second program comprises a program for recording said call charge data for a customer telecommunications call for subsequent processing to prepare customer billing information.

36. A method of deriving call charge data for customer telecommunications calls characterized in that the method comprises the steps of:
receiving a plurality of data messages from a plurality of telecommunications switching at a shared rating system;
automatically calculating, in response to the receipt of one of the data messages from one of the switching systems, numerical call rating data for said one of the switching systems for charging on a customer call served thereby using data tables of the shared rating system; and
transmitting said calculated numerical call rating data to said one of the switching systems.

37. The method of claim 36 further comprising the step of notifying a customer of charge data, derived from said rating data, for said customer call.

38. The method of claim 36 further comprising the step of:
recording charge data derived from said rating data, for said customer call at said switching system for subsequent preparation of customer billing information.

39. The method of claims 37 or 38 further characterized in that the data messages comprise source, destination, and billing type parameters and wherein the step of calculating call rating data comprises the step of calculating the amount of the charge using the source, destination, and billing type parameters.

40. The method of claim 39 further characterized in that the step of trnasmitting comprises the step of transmitting via a common channel signaling system comprising a signal transfer point for switching data messages among a plurality of data links.

41. The method of claim 39 further characterized in that the source parameters comprise at least part of an originating directory number of originating customers and the destination parameters comprise at least part of a terminating directory number of terminating customers;
wherein the data tables comprise source tables for translating from the at least part of the originating directory numbers to first intermediate data, destination tables for translaing from the least part of the terminating directory numbers to second intermediate data, and charge data tables for translating from the first intermediate data, second intermediate data and billing type parameters to third intermediate data comprising charging parameters for calculating call charge data;
wherein the step of automatically calculating call rating data comprises the steps of accessing the source tables using the at least part of the originating directory numbers to obtain first intermediate data, of accessing the destination tables using the at least part of the terminating numbers to obtain second intermediate data, and of accessing third intermediate data of the charge data tables using the first and second intermediate data and the billing type parameters.

42. The method of claim 41 further characterized in that the step of calculating call rating data further comprises the step of deriving a jurisdictional category from the first and the second intermediate data, and of further using the jurisdictional category for accessing the third intermediate data.

43. A telecommunications switching system having a stored program controlled processor comprising call processing programs for controlling telecommunications calls, characterized in that the call processing programs comprise:
a first program (203) to generate and transmit a first data message, to a rating system shared by a plurality of telecommunications switching systems, for requesting numerical call rating data for charging for a customer call served by the switching system; and
a second program (205) responsive to a second data message received from said rating system, generated and transmitted to the switching system in response to the first data message, comprising call rating data information for the customer call served by the switching system for controlling dissemination of the call charging data derived from said rating data, for the customer call.

44. The switching system of claim 43 further characterized in that the second program comprises a program for controlling collection of coins for a coin call.

45. The switching system of claim 43 further characterized in that the second program comprises a program for controlling transmission of automatlc charge quotation data to an automatic charge quotation system.

46. The switching system of claim 43 further characterized in that the second program comprises a program for generating charging data for notifying a customer of charges for a time and charge call.

47. The switching system of claim 43 further characterized in that the second program comprises a program for generating information data for notifying a customer of charges for a postulated call specified by the customer.

48. The telecommunications system of claim 43 wherein said second program comprises a program for recording charges for a customer telecommunications call for subsequent processing to prepare customer billing information.

49. A method of deriving call charge data for a customer call receivable from a calling customer station comprising the steps of:
receiving a first data message from one of a plurality of telecommunications switching systems to a data base, said first data message comprising data for said customer call receivable through said one of said plurality of switching systems;
in response to said first data message, calculating numerical call rating data for said customer call using data tables of said data base system; and
transmitting a second data message comprising said numerical call rating data for said customer call from said data base system to said one switching system for deriving charge data for said customer call at said switching system.

50. The method of claim 49 further comprising the step of notifying a customer at said customer station of said charge data for said customer call.

51. The method of claim 49 further comprising the step of:

recording said charge data for said customer call at said office for subsequent preparation of customer billing information.

52. The method of claim 50 or 51 wherein said first data message comprises source, destination, and billing type parameters for said call, and wherein said step of calculating charge data comprises the step of calculating the amount of the charge for said call using said source, destination, and billing type parameters.

53. The method of claim 52 wherein said step of transmitting a second data message comprises the step of transmitting said second data message via a common channel signaling system comprising a signal transfer point for switching data messages among a plurality of data links.

54. A method of driving call charge data for a customer call receivable from a calling customer station comprising the steps of:

receiving a first data message from one of a plurality of telecommunications switching systems to a data base, said first data message comprising data for said customer call receivable through said one of said plurality of switching systems;

in response to said first data message, calculating rating data for a chargeable call using data tables of said data base system; and transmitting a second data message comprising said rating data from said data base system for processing of charges for said customer call.

55. The method of claim 54 wherein said second data message is transmitted to a call charge processing system for processing charges for said customer call.

56. The method of claim 54 wherein said second data message is transmitted to one of a plurality of call charge processing systems for processing charges for said customer call.

57. The method of claim 56 wherein each of said plurality of call charge processing systems is a regional call charge processing system for processing charges for customer calls of a geographic region.

* * * * *

UNITED STATES PATENT AND TRADEMARK OFFICE
CERTIFICATE OF CORRECTION

PATENT NO. : 4,726,056

DATED : February 16, 1988

INVENTOR(S) : Chungming An, Martin Erk, Michael A. Kefauver, Richard A. Williams It is certified that error appears in the above-identified patent and that said Letters Patent is hereby corrected as shown below:

Claim 5, column 16, line 20, delete the comma after "accessing".

Claim 22, column 18, line 46, after "for", insert --use--.

Claim 25, column 19, line 3, after "base", insert a semicolon.

Claim 25, column 19, line 9, delete "and" and substitute --an--.

Claim 25, column 19, line 14, after "source" delete "table" and substitute --tables--.

Claim 25, column 19, line 15, after "destination" delete "table" and substitute --tables--.

Claim 25, column 19, line 28, delete "of" and substitute --for--.

Claim 25, column 19, line 30, delete "secod" and substitute --second--.

Claim 30, column 20, line 57, after "charge", insert --data--.

Claim 33, column 20, line 66, after "claim 30", insert --wherein said second program comprises a program--.

Claim 36, column 21, line 14, after "switching", insert --systems--.

Claim 40, column 21, line 40, delete "trnasmitting" and substitute -transmitting--.

Claim 41, column 21, line 53, delete "translaing" and substitute --translating--.

Claim 41, column 21, line 53, after "the", insert --at--.

Claim 41, column 21, line 65, after "terminating", insert --directory--.

UNITED STATES PATENT AND TRADEMARK OFFICE
CERTIFICATE OF CORRECTION

PATENT NO. : 4,726,056

DATED : February 16, 1988

INVENTOR(S) : Chungming An, Martin Erk, Michael A. Kefauver, Richard A. Williams It is certified that error appears in the above-identified patent and that said Letters Patent is hereby corrected as shown below:

Claim 43, column 22, line 23, after "comprising", insert --numerical--.

Claim 54, column 23, line 18, delete "driving", and substitute --deriving--.

Signed and Sealed this

Sixth Day of September, 1988

Attest:

DONALD J. QUIGG

Attesting Officer

Commissioner of Patents and Trademarks